Dec. 11, 1962 G. H. SMITH 3,067,612
METER REGISTER ASSEMBLY INCLUDING INTERNAL SPACER COLLAR
Filed March 17, 1958
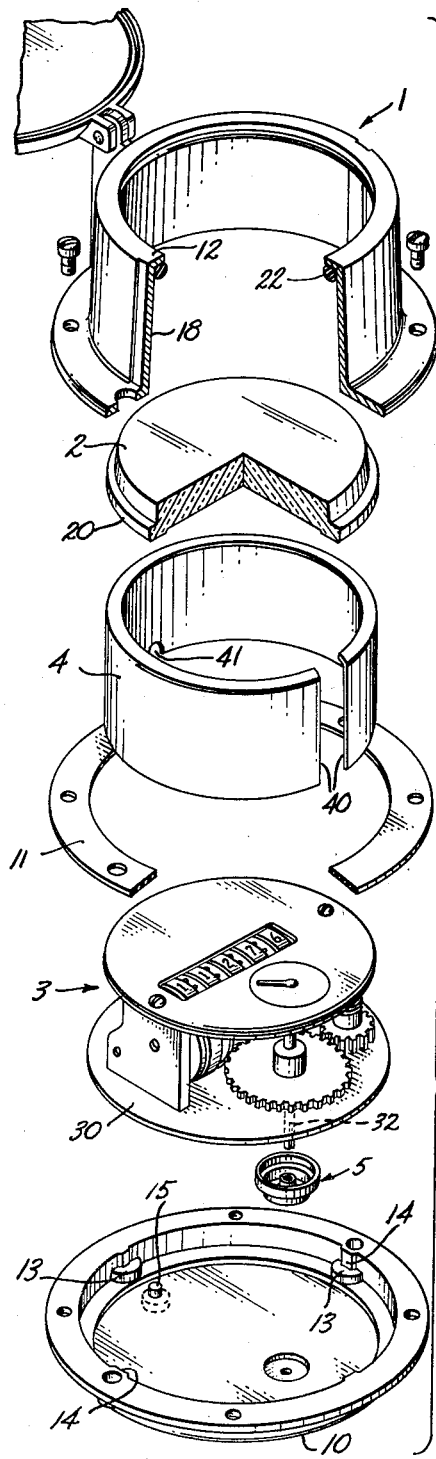
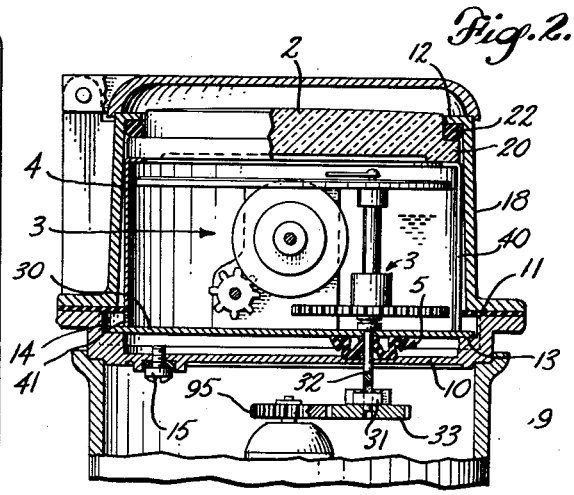
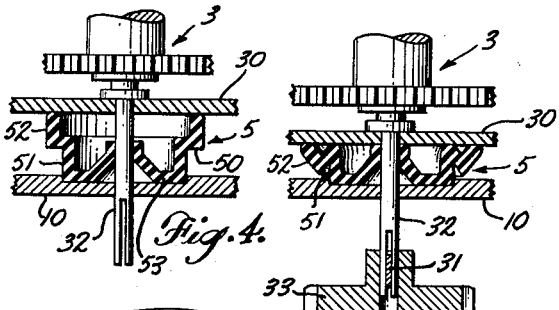
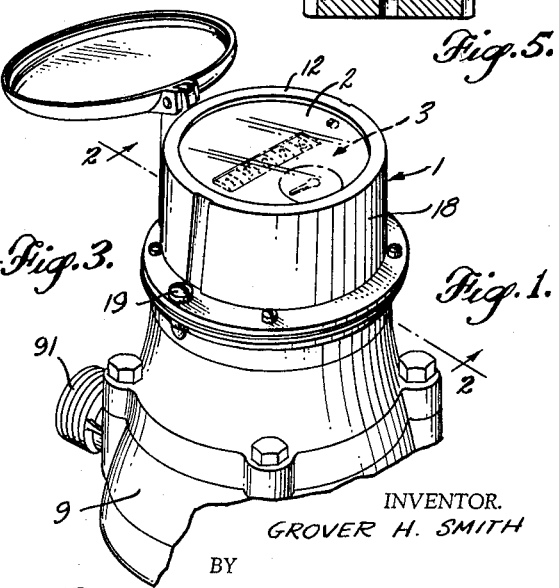
INVENTOR.
GROVER H. SMITH
BY
Reynolds, Beach & Christensen
ATTORNEYS

United States Patent Office 3,067,612
Patented Dec. 11, 1962

3,067,612
METER REGISTER ASSEMBLY INCLUDING
INTERNAL SPACER COLLAR
Grover H. Smith, 4042 39th St., SW., Seattle, Wash.
Filed Mar. 17, 1958, Ser. No. 721,936
12 Claims. (Cl. 73—273)

This invention is an improvement in certain respects over the register assembly for fluid meters disclosed in the prior patent to myself and Richard D. Wans, No. 2,738,672, of March 20, 1956. As in the prior patent, the present invention contemplates a register assembly wherein register mechanism is wholly enclosed within a register box which is intended to be almost completely filled with oil for the purposes of preventing fogging of the transparent window or lens at the top through which the register mechanism is visible, and of preventing corrosion of the register mechanism such as may occur if moisture is permitted access to the same. This invention contemplates a completely self-contained register assembly which may be completed and filled with oil at the shop or factory, as a separate assembly ready for application to a meter housing in the field. When so applied, the register mechanism of such assembly is coupled to the meter mechanism.

The register assembly includes a transparent lens or disk urged outwardly, or upwardly, by a spacer sleeve or collar within the register box which at its upper end engages the lens, and at its lower end is pressed upwardly by securing and sealing to the lower end of the register box a separate pan which constitutes the bottom of the register box. The upward pressure of the lens clamps an O-ring or similar seal between facing flanges at the upper end of the register box casing and the lens, to seal the register box effectively at its upper end. Also, according to the present invention, special provisions are provided for insuring the evacuation of almost all the air from the interior space of the register box and the filling of that space with oil through a filler opening in the bottom pan, special constructional features within the register box insuring such evacuation and filling.

Further, a triple seal of a particular nature is provided around the driving shaft which protrudes from the register mechanism through the bottom pan for engagement with a complemental coupling element of the meter mechanism. This seal seals the aperture in the oil-filled register assembly around the driving shaft passing through it and maintains the same against leakage of oil during shipment and in use.

The features and combinations which constitute the present invention will be best understood after a description of the same in this specification, having reference to the accompanying drawings, and which are defined in the claims at the end of this specification.

FIGURE 1 is an isometric view of the fully assembled meter, including the meter casing and register box.

FIGURE 2 is an axial sectional view through the register assembly and through the upper portion of the meter assembly, the plane of section being indicated at 2—2 in FIGURE 1.

FIGURE 3 is an exploded isometric view of the register assembly, parts being broken away.

FIGURE 4 is an axial sectional view, enlarged, of the special seal, shown in its relaxed condition, and FIGURE 5 is a similar view of the same, showing parts in the position of use, with the sealing cup deformed.

The register mechanism may be a standard or known device, composed of the gears, disks or numbered wheels, pointers and the like, together with the immediate supports therefor and a driving shaft, by means of which register mechanism the quantity of water passing through the meter is indicated. This register mechanism is received within a register box which, according to the present invention, is completely separable from the meter housing but which in use seats upon the top of the latter. The register box is preferably of metal so that it thoroughly protects the register mechanism within it, and normally would be provided with a cover hingedly or otherwise movably supported whereby a transparent lens or disk, closing the top of the register assembly, may be accessible for viewing the register mechanism within, but can be protected from injury. The meter mechanism is housed within a meter housing, and the details are not pertinent to the present invention, other than it has a drive coupling arrangement which engages with a complemental coupling element projecting below the register assembly for driving the register mechanism.

The meter housing 9 is, as usual, provided with connections such as the one at 91 and another, not shown, opposite 91, one of which is for inlet of water to the meter and the other of which is for the discharge of the water therefrom. It is assumed that the fluid being metered is water, for the meter illustrated is a typical water meter. The meter mechanism is not shown other than a terminal spur gear 95 which couples with and drives a complemental gear described later, which is part of the register mechanism. The meter housing is open at its upper end and the register box, indicated in general by the numeral 1, closes the top of the meter housing, and is secured on it by means such as the screws 19.

The register box includes primarily an outer casing 18 which is open at its top and at its bottom, a separate bottom closure formed as a pan 10, and a transparent lens or disk 2 closing its top. The pan 10 is sealed to the bottom of the casing 18 by a gasket 11 which, for a purpose that will be made clear hereinafter, preferably projects slightly inwardly of the inner wall of the casing 18. The pan 10 and casing 18 are held together, and the gasket 11 is clamped, by means such as the screws shown in FIGURES 1 and 3. The casing 18, at its upper end, has inwardly extending flanges 12.

The transparent disk 2 which closes the upper end of the register box 1 fits within the casing 18, and is formed with a circumferential flange 20 complemental to the casing flange 12. A deformable sealing ring, such as the O-ring 22, is interposed between the flanges 12 and 20, and when parts are assembled this O-ring is deformed by being urged upwardly, and effects an oil-tight seal about its circle. Thus the flange 12 constitutes sealing ring retainer means.

The register mechanism is indicated generally by the numeral 3. Its details of construction are in the main not material, and any standard register mechanism may be provided, usually including numbered disks, a pointer, a dial, and gearing to effect proper movements of its component parts. However, the register mechanism does include a base plate 30 whereon all the remainder of the register mechanism is mounted. A drive shaft 32 for the register mechanism penetrates the base plate 30, and protrudes beneath the pan 10, where it mounts a spur gear 33 or other suitable coupling or driven member for engagement with the terminal element of the meter mechanism, which is the spur gear 95.

Since the gears 33 and 95 must be quite exactly located to remain in proper driving engagement, it follows that the base plate 30 must be accurately located within the register box and held immovably in such position. The base plate rests upon circumferentially short ledges 13 spaced circumferentially around the pan 10, which space it from the bottom of the pan. Axially and inwardly directed ridges 14 space the edge of the base plate inwardly from the inner wall of the pan, and center the base plate within the pan. It is pressed down upon the ledges 13, and held in this position, by an inner sleeve or collar 4, of a height when resting upon the base plate 30 to engage and be pressed downwardly by the lens 2. The tightening of the screws, it will be seen, clamps the seals 22 and 11, and anchors the base plate 30 in its proper position within the register assembly through the spacer collar 4.

In order to avoid fogging of the inner surface of the lens 2 by exclusion of moisture from the register box, and in order to avoid corrosion of the register mechanism from access of water to it during use, it is desirable that the interior of the register box be substantially filled with oil, preferably at the factory or in the shop. To this end, a filler opening normally closed by the plug 15 is provided in the bottom of the register box, that is, in the pan 10. While the presence of a small air bubble within the register box is not harmful, and indeed may be helpful in compensating for pressure variations due to thermal effects, most of the air should be evacuated from the register box, and the space filled with oil. Since there are subdivisions or small chambers within the register box that can trap unwanted volumes of air, it is important that provision be made for venting each such subdivision through the single filler opening.

The oil is supplied through the opening normally closed with the plug 15 while the register box is inverted. The spacer collar 4 is slit lengthwise, at 40, diametrically opposite this filler opening. This is advantageous in that the collar can fit within outer casings of slightly varying diameter, but the slit 40 is quite important in that in the filling position oil may pass through it from the annular space between the collar 4 and the casing 18 to the space within the interior of the collar. If the register box is tilted somewhat, as it is naturally in the filling operation, the slit 40 will be lowermost so that the oil may flow upward through it into the lower portion of the space within collar 4. Air from the upper portion of the space within collar 4 can escape into the upper portion of the small annular chamber between the base plate 30 and the sealing washer 11 through the notch 41 which, during filling, is at the top of the chamber. Finally, the air escapes about the periphery of the base plate 30 into the space between the pan 10 and the base plate, it being remembered that the base plate rests only upon ledges 13 and as its periphery spaced from the wall of casing 18 by the ridges 14. Almost all the air can thus escape through the filling opening, leaving the register box almost completely oil-filled. Oil sufficient only to cover the gears of the register mechanism will inhibit corrosion, but the almost complete filling described is preferred to reduce as much as possible the air content of the casing which may carry water vapor.

Seals 22 and 11 are adequate to seal the upper and lower ends of the casing 18 at its periphery, but it is necessary also to provide a seal against leakage of oil around the rotative shaft 32. A special sealing element 5 is provided for this purpose. Preferably it is in the form of a cup of resiliently deformable material, such as elastomer material, having wall portions 51 and 52 of different diametral extent, joined by a rather abrupt ledge 50. The lip of the larger cup wall portion 52 engages one of the two parallel oppositely facing surfaces constituted by the upper surface of the pan 10 and the lower surface of the base plate 30, and the bottom 53 of the cup, which closely surrounds the shaft 32, engages the other such surface. As shown, the lip at the edge of the portion 52 engages about a circle with the lower surface of the base plate 30, and the bottom 53 engages the upper surface of the pan 10.

It will be remembered that the pan 10 is drawn axially towards the sleeve 4 to clamp the sealing ring 11, utilizing screws for the purpose, and this axial approach of the pan and base plate 30, which serves to seat the latter firmly, serves also to collapse the interposed sealing cup 5 axially, from the position of FIGURE 4 to that of FIGURE 5. When so collapsed, the ledge 50 is folded upwardly and slightly inwardly, and the circumferentially smaller wall portion 51 is of a height that it makes contact with the lower surface of the base plate 30 about a second line of contact inwardly from the location at which the lip of the portion 52 engages such surface, to effect a double seal.

In addition, the bottom 53 is reentrant, as a central dished or coned web terminating in a sleeve snugly embracing the shaft 32. Such central portion extends axially sufficiently so that the end of such sleeve also contacts the lower surface of the base plate and this constitutes a further seal. In addition, such pressure of the sleeve end endwise against the surface swells the sleeve radially to hug the shaft closely and effect a seal around it. The bottom 53 of the cup is also flattened somewhat more by deformation where it presses about a broad zone against the upper surface of the pan 10. The combined effect of the wall, bottom and web-sealing components is to create a thoroughly fluid-tight seal surrounding the shaft 32.

The register mechanism is well protected by the register box consisting of the casing 18 and pan 10, but in order to protect the disk or lens 2, which may be of plastic or heat-treated glass, from breakage, scratching or other injury, it is desirable to provide a cover hingedly supported on the casing 18 as shown in FIGURES 1, 2 and 3.

I claim as my invention:

1. A register box for a meter, comprising an upright casing open at its upper and lower ends, a pan seated upon and closing the lower end of said casing, a transparent disk received within the upper portion of said casing, the upper end of said casing and said disk having complemental facing flanges, a deformable sealing ring interposed between said flanges, and a spacer collar within said casing, reacting from said pan, and of a length to press upwardly on said disk and clamp said sealing ring between said flanges when said pan is seated upon said casing for closing the upper end of said casing.

2. The register box defined in claim 1, in which the pan has a normally closed filler opening therein.

3. The register box defined in claim 2, in which the spacer collar is spaced from the inner wall of the casing, the filler opening is in communication with the space between the spacer collar and the casing, and the spacer collar is split lengthwise to afford communication between the space within it and the space between the spacer collar and the casing.

4. The register box defined in claim 1, and register mechanism enclosed within the register box including a supporting base plate resting upon the pan, the lower end of the spacer collar bearing on said base plate.

5. The register box defined in claim 4, the register mechanism including a shaft extending downwardly through the pan, and a contractable sealing cup surrounding said shaft between the pan and the base plate and being of an unstressed height exceeding the distance therebetween when the base plate is resting on the pan, so that said sealing cup is contracted by engagement with the pan and the base plate.

6. The register box defined in claim 5, wherein the sealing cup includes a deformable stepped wall, the height of the wall portion at one side of such step approximating the distance between the pan and the base plate when the base plate is resting on the pan so that such wall portion bears against both the base plate and the pan.

7. A register assembly comprising a base, register mechanism mounted thereon, an open-ended casing surrounding said register mechanism, a transparent disk within and closing one end of said casing for viewing the register mechanism, a collar within said casing having one end bearing against said disk and its other end bearing against said base, each of the casing and disk having flanges each facing the other, a resiliently deformable sealing ring interposed between said flanges, a pan closing the other end of said casing and engageable by said base, and means reacting between said pan and said casing to urge said pan, base and collar towards said disk for clamping said sealing ring retween said flanges.

8. The register assembly defined in claim 7, in which the pan has a plurality of circumferentially spaced internal ledges above its bottom engageable by the base, and the pan further has a plurality of circumferentially spaced ridges above said ledges projecting inwardly from its wall which space the edge of the base from such wall.

9. The register assembly defined in claim 7, including a gasket engaged between the pan and the adjacent end of the casing, projecting inwardly beyond the inner wall of the casing and engaging the collar to space it inwardly from the casing.

10. The register assembly defined in claim 7, the collar being spaced from the inner wall of the casing and slit lengthwise to afford communication between the space within the collar and the space between the casing and the collar, means spacing the base from the pan to form a space therebetween in communication with the space between the casing and the collar, and the pan having a normally closed filler opening therein for entry of oil to and escape of air from the space between the base and the pan.

11. A register assembly comprising a base, register mechanism mounted on said base, a casing open at its ends and encircling said register mechanism, a transparent disk within said casing and closing one end thereof through which the register mechanism is visible, said disk having a circumferential flange, said casing having a complemental flange located axially outwardly of said disk flange and space therefrom, a deformable sealing ring interposed between and engaging said flanges, a pan engaged with said base and closing the end of said casing opposite said disk, said register mechanism including a driving shaft extending through said base and said pan, a collar encircling said register mechanism within said casing and having its ends bearing upon said disk and said base, respectively, means reacting from said casing to urge said pan, base and collar toward said disk for clamping said sealing ring, and deformable sealing means surrounding said driving shaft and interposed between said base and said pan, said sealing means when relaxed being of greater height than the space between said base and pan and being deformed by approach of said pan and said base while maintaining sealing engagement therewith.

12. A meter register comprising a casing having open opposite ends, one casing end having sealing ring retainer means projecting inwardly therefrom, a sealing ring within said casing and having one side engageable with said sealing ring retainer means, a casing end closure disk within said casing and engageable with the other side of said sealing ring, closure means engageable with the end of said casing remote from said sealing ring retainer means for closing such casing end, and means engaged with and reacting between said closure means and said casing end closure disk and of an extent axially of said casing to press said disk against said sealing ring and said sealing ring against said sealing ring retainer means by pressure of sad closure means on said last means, for clamping said sealing ring between said disk and said sealing ring retainer means.

References Cited in the file of this patent

UNITED STATES PATENTS

| | | |
|---|---|---|
| 1,945,056 | Marden | Jan. 30, 1934 |
| 2,246,250 | Hanks | June 17, 1941 |
| 2,354,563 | Weisse | July 25, 1944 |
| 2,598,094 | Augereau | May 27, 1952 |
| 2,707,118 | Swartz et al. | Apr. 26, 1955 |
| 2,738,672 | Smith et al. | Mar. 20, 1956 |
| 2,757,364 | Hood | July 31, 1956 |
| 2,764,022 | Hague | Sept. 25, 1956 |
| 2,854,848 | Hood | Oct. 7, 1958 |